Figure 1:
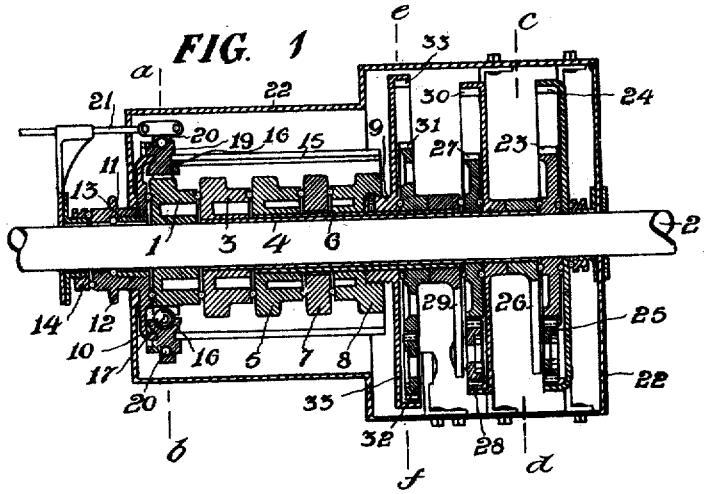

L. WIRTZ.
CHANGE SPEED AND REVERSING GEAR.
APPLICATION FILED JULY 6, 1907.

918,631.

Patented Apr. 20, 1909.
4 SHEETS—SHEET 1.

WITNESSES:

INVENTOR,
LUIS WIRTZ,
BY
Attorneys.

L. WIRTZ.
CHANGE SPEED AND REVERSING GEAR.
APPLICATION FILED JULY 6, 1907.
918,631.
Patented Apr. 20, 1909.
4 SHEETS—SHEET 2.
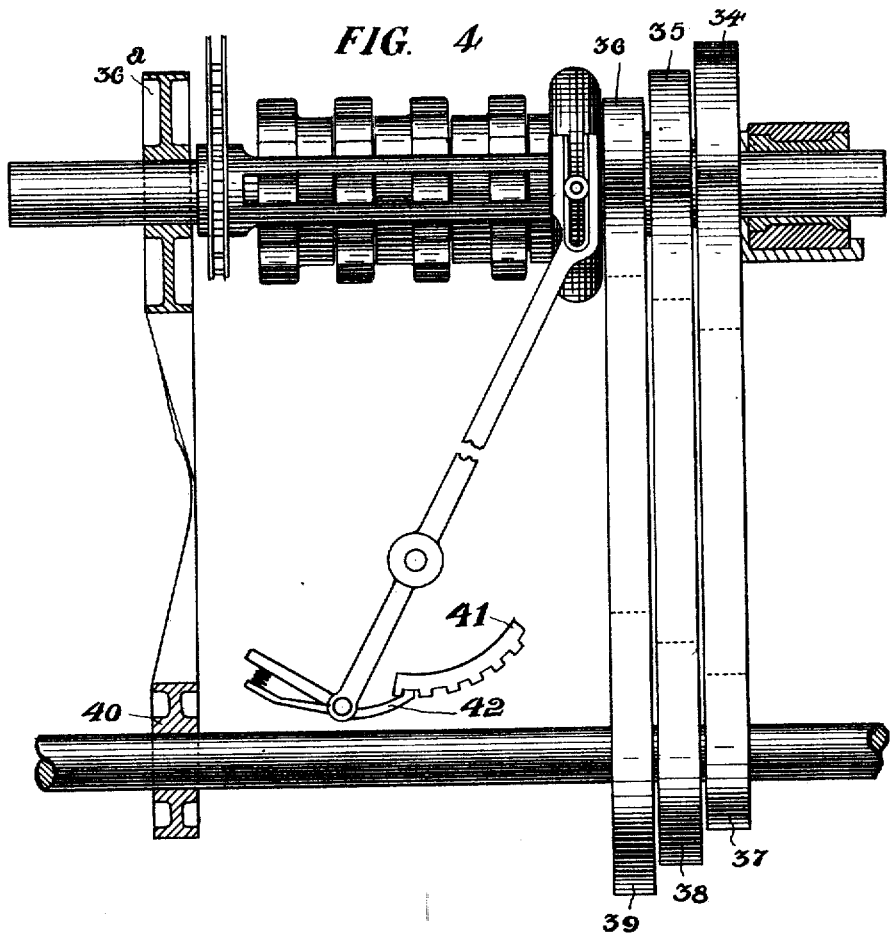
FIG. 4
FIG. 5
WITNESSES:
INVENTOR,
LUIS WIRTZ,
BY
ATTORNEYS.
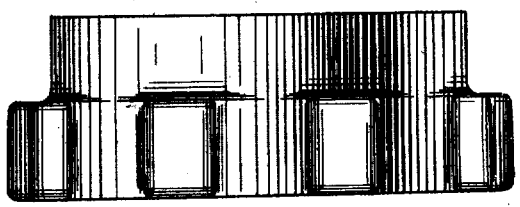

L. WIRTZ.
CHANGE SPEED AND REVERSING GEAR.
APPLICATION FILED JULY 6, 1907.

918,631.

Patented Apr. 20, 1909.
4 SHEETS—SHEET 3.

WITNESSES,

INVENTOR,
LUIS WIRTZ,
BY
Attorneys.

UNITED STATES PATENT OFFICE.

LUIS WIRTZ, OF BILSTON, ENGLAND.

CHANGE-SPEED AND REVERSING GEAR.

No. 918,631.　　　　Specification of Letters Patent.　　Patented April 20, 1909.

Application filed July 6, 1907. Serial No. 382,511.

*To all whom it may concern:*

Be it known that I, LUIS WIRTZ, residing at Studley House, Bilston, in the county of Stafford, England, have invented certain new and useful Improvements in Change-Speed and Reversing Gears, of which the following is a specification.

My invention relates to improvements in change speed and reversing gears, and has for its object the provision of a gear enabling change of speed being effected, without stopping the mechanism, in a smooth and easy fashion, thus obviating the shock and friction, and resulting noise and damage experienced with gears as hitherto formed.

The invention is applicable for use in all cases where it is desired to drive a secondary rotary member at various speeds from a prime mover. In the present instance I shall describe it as constructed for use with motor road vehicles where the qualities of easy, smooth and noiseless changing of the gear are most desirable, but it is equally applicable for driving propellers from a turbine where a reverse is not obtainable in the ordinary way and for various other uses.

The invention lies in the application of the ball for forming the shiftable connection between the driving and the driven members of the gear; the essential elements being a series of speed drums or rings, a ring or series of rings of balls with a collar connected to the necessary shifting rod for effecting the movement for establishing connection between one of the drums and the driven member.

In carrying the invention into effect the speed drums may be mounted on concentric sleeves with one keyed on the shaft driven from the motor or clutch shaft through suitable means or otherwise driven from the motor. The drum on the shaft may be the high speed and the drum on the inner sleeve the second speed, the next drum the third speed, then a free disk and then the reverse or the number of drums may be increased for more speeds. The sleeves are driven at the speeds required; this may be effected in several ways, three will be hereafter given as examples. The drums are each formed with a ring of projections extending in width about halfway across the periphery, the remaining portion of the surface being plain and smooth. The projections are preferably rounded on their edges for reasons to be hereafter stated.

In gears a number of concentric sleeves have before been used for carrying different speed pinions after the same manner as my speed drums are mounted, but this is not claimed as new in itself by me.

The driven member may consist of a hollow bearing boss with a sprocket wheel or the like on the outer end and with a slotted cylinder or two, three, four or more guides from the inner end, concentric to the drums. The series of balls is engaged by a notched ring, each ball having a hemispherical recess or notch in which it may freely work. The notched ring can be connected by portions engaging the before mentioned guides of the driven member to another ring on the outer side of the cylinder or guides. This latter ring forms a bearing between the notched ring and a fixed ring or collar and may have a ring of balls or be left plain. The driven member and the notched ring rotate together at the speed equal to that of the particular drum with which the notched ring carrying the locking balls is connected. The fixed ring is provided with means for being readily moved along, such as a forked lever or equivalent.

Supposing the driving balls are in connection with the drum direct on the shaft—the top speed drum—then the notched ring will be driven at that speed, and with it the guides and sprocket forming the driven members also. To change to the next speed the fixed collar is slipped along by the operating means and carries the notched ring further along the guides, disengaging the balls from the projections of the first drum and moving them onto the plain portion of that drum when the notched ring becomes free. A continuation of the movement brings the balls into engagement with the projections of the next drum traveling at the second speed and the driven member is then rotated at that speed. This operation is the case with all the changes which are effected in the smoothest and easiest possible manner without the excessive jerking and grinding which takes place with ordinary gears and which causes such great damage to the teeth and adds very considerably to the cost of maintenance of the car.

The lever operating the sliding collar is actuated by rods from a convenient control near or on the steering pillar of the car and at the point of control a positive rack and pawl or equivalent device, such as now used on motor vehicles, is employed for keeping the sliding collar at a standstill over the particular speed drum in use. The notches on the quadrant or rack would correspond to the positions the collar would have to assume over the drums to bring the notched ring and its locking balls into engagement with the projections on same.

The methods of effecting the driving of the drums at the required speeds, as stated, are numerous, but as examples I may give the following: The sleeves carrying the forward driving drums may be extended to one end and the reverse to the other, so that the sleeves would project from each other in regular steps at one end. On each a driving pulley would be keyed and a pulley would be keyed to the shaft to which the top speed drum is connected. Then on the motor shaft, pulleys ranging inversely in the matter of size, would be arranged opposite the sleeve pulleys, and belts would be arranged on these for driving direct onto the pulleys on the sleeves. Thus the drums would be rotated at the various speeds determined by the relation of the size of the respective pulleys or equivalents. The reverse pulley would be driven by a crossed belt from a pulley or equivalent on the motor shaft or clutch shaft. The driving of the drums at the various speeds may be effected while employing only one drive from the motor shaft or clutch shaft by using a series of disks with rings of teeth and pinions as will hereafter be explained with reference to the accompanying drawings.

Figure 2:
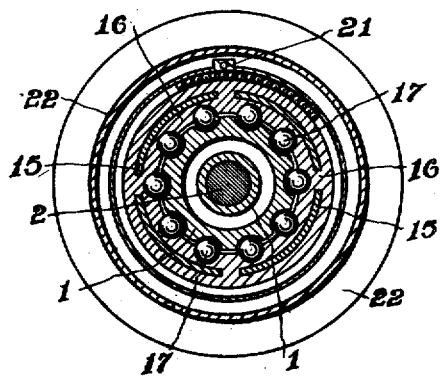
Figure 3:
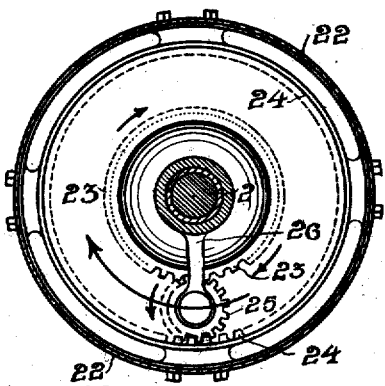
Figure 3A:
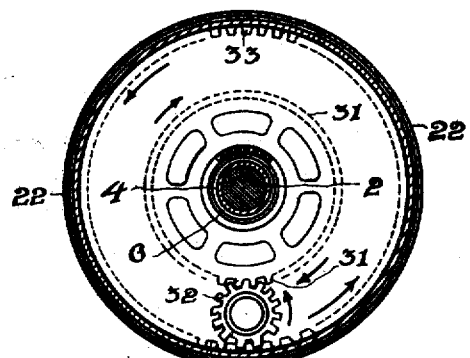
Figure 6:
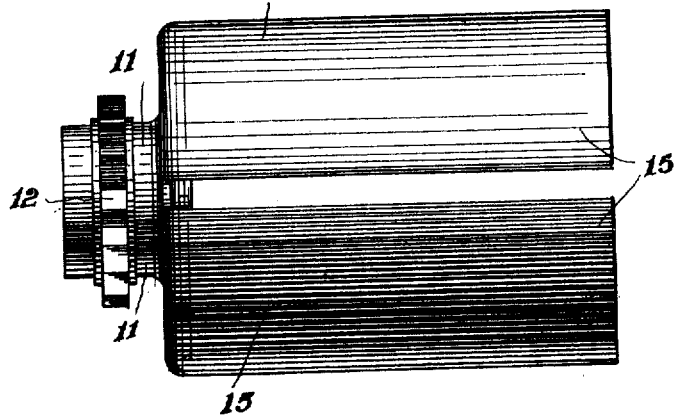
Figure 7:
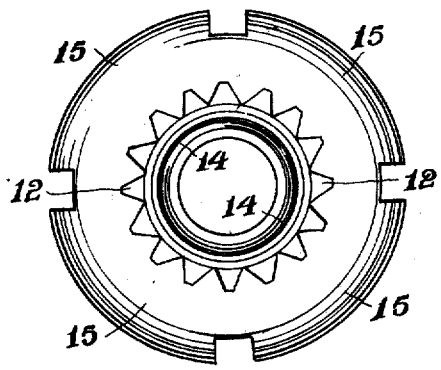
Figure 8:
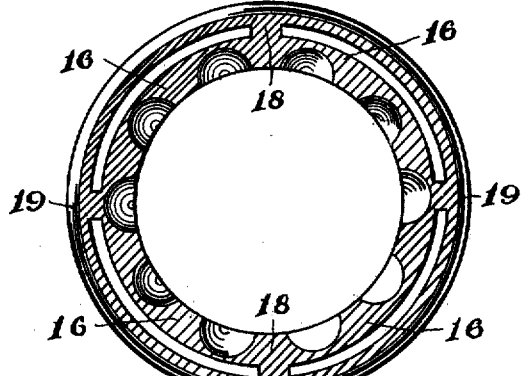
Figure 9:
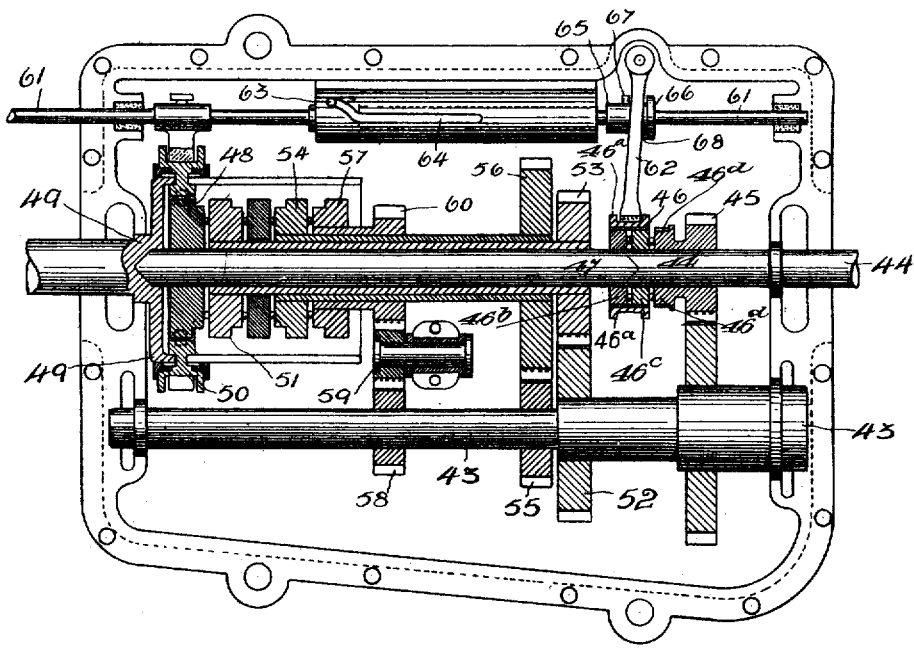

On the drawings, Figure 1. shows in section a gear constructed in accordance with my invention. Fig. 2. is a cross section taken on line a—b of Fig. 1. Fig. 3. is a cross section on line c—d of Fig. 1. Fig. 3^A is a cross section at e—f, of Fig. 1. Fig. 4. shows in plan the invention with a different drive. Fig. 5. is a plan of one of the speed drums. Fig. 6. shows one form of the driven member detached. Fig. 7. is an end view of same, and Fig. 8. is a view of the notched ring carrying the driving balls. Fig. 9. is a section showing a further modification of the drive.

At Figs. 1, 2, and 3, of these drawings, which are by way of example only, for the invention as previously stated may be carried out in a number of ways, 1 is the top speed drum keyed onto the shaft 2, 3 is the second speed drum keyed onto the sleeve 4—5 is the low speed drum on the sleeve 6, 7 is a free disk and 8—the reversing drum positively connected to the boss 9. 10 is the driven member consisting of a boss 11 carrying a sprocket 12 or equivalent, a bearing 13 and a thrust bearing 14, at the end. From the boss 11 the guiding cylinder 15 projects, 16 is the notched ring for taking the driving balls 17; this ring has connections 18 adapted for sliding in the guiding cylinder to an outer ring 19. The outer ring 19 forms a bearing between the rotary members (the recessed ring 18 the guides 15) and the sliding collar 20. The collar 20 is fixed as regards rotary movement but is engaged by any known shifting device 21 such as a rod or fork for effecting its movement along the guiding cylinder 15.

At Fig. 1, the balls 17 controlled by the notched ring 16 are in contact with the projections on the top speed drum 1, so that they would be driving at that speed, the ring 16 and through it the driven member 10 carrying the sprocket 12 from which the drive would be taken by a chain or in any other way. To bring the second speed drum into gear the rod 21 would be operated to slide the collar 20 and with it the ring 16 and balls 17; the latter coming out of the projections on the first drum onto the plain surface of the latter where they would be free and the slip help to reduce the speed and facilitate their entry into the ring of projections on the drum 3. When in the projections of the drum 3 they would of course be driven and transmit the drive at the speed of that drum. A suitable aluminium or other case forming an oil or grease box is provided for inclosing the gear as roughly indicated by 22.

The drive is effected by a belt, chain or the like from the motor or clutch shaft direct onto shaft 2, of the gear; keyed onto the shaft is a pinion 23 gearing with a small pinion 25 carried on a stud on an arm 26 keyed to the first sleeve 4. The shaft 2 drives the drum 1 directly while the pinion 23 on the shaft drives the small pinion 25 on the arm 26, which pinion is in mesh with a fixed annulus 24 as seen at Figs. 1 and 3. Thus the drum 3 on the sleeve 4 is driven by the pinion 23 through the arm 26 keyed to the sleeve. A pinion 27 on this sleeve 4 gears with a second small pinion 28 carried on an arm 29 from the second sleeve 6. This small pinion 29 is in mesh with a fixed annulus 30, so that the second sleeve is driven from the first in the same manner as that is driven from the shaft. For the reverse a pinion 31 keyed on the sleeve 6 meshes with a pinion 32 carried by a fixed bracket and this pinion drives an annulus 33 secured to the reverse drum 8 as seen at Figs. 1 and 3^A.

At Fig. 4, the gear is shown driven by belts directly from the motor or clutch shaft. Each sleeve has a separate pulley 34 for the high, 35 for the second and 36 for the low speed with a pulley 36^A on the other end of the shaft for the reverse. These pulleys are faced on the motor shaft with pulleys 37, 38, and 39, while the reverse has a pulley 40 for a crossed belt drive. From this it will be seen that each sleeve is driven direct from the motor shaft, the ratio of the pulleys giving the speeds required. Although belts are shown of course a chain or tooth drive may be used if desired.

At Fig. 4. is roughly represented a means for shifting the notched ring for varying the speed and a quadrant 41 and pawl 42 are represented in connection with the same. Some such positive locking must be used to insure the notched ring carrying the locking balls being retained against axial movement during driving.

In the arrangement shown at Fig. 9, a secondary shaft 43 is employed. The driving shaft 44 in this case carries a free pinion 45 for rotating the secondary shaft 43. The driving shaft can be clutched to the pinion 45 by the clutch 46 or it can be clutched to the shaft 47 carrying the top speed drum 48. The clutch arrangement represented by 46 comprises an ordinary spool 46$^a$, with engaging dogs on its inner contour adapted to slide over the collars 46$^b$, 46$^c$, 46$^d$; of the collars 46$^b$ is securely connected to shaft 47, 46$^c$, to shaft 44. In position seen at Fig. 9 the clutch connects 46$^b$ to 46$^c$, but a movement to the right of the spool 46$^a$ causes it to connect 46$^c$ to 46$^d$. With the top speed in gear as shown the drive is direct onto the drum 48 and through the balls to the driven member 49. When the balls are moved by the shifting device 50 to engage the second speed drum 51 the clutch 46 is at the same time operated to clutch the shaft 44 to the pinion 45 and so drive the secondary shaft 43. Through the pinion 52 on this shaft the pinion 53 on the drum sleeve and the drum 51 are driven and the drum transmits motion through the balls to the driven member 49. With the clutch in this latter position the third drum 54 is rotated by the pinions 55 and 56, while the reverse 57 is operated through pinions 58, 59 and 60, so that when the balls are moved to engage either of the drums 54 or 57 the drive is transmitted through them. In this arrangement a suitable device is provided on the rod 61 actuating the shifting member so that the clutch lever 62 moves with it when the member is changed from the top speed drum to the second, and is at rest during the other changes.

In the device shown a pin 63 is arranged on the rod 61 and travels in a slot 64 and collars 65, 66, with projections 67, 68 are arranged near the lever and adapted to hit projections on the lever when turned to register with them. At the position shown the top speed drum is in gear and the clutch lever is pulled over to the left, the pin 63 on the rod being in the extremity of the slot. The projections 67, 68, are in touch with the lever projections and as the rod is moved to shift the speed to the second drum 51, the lever is pushed over, but the rod is rotated by the pin following the slot and the projections gradually clear the lever and the straight part of the slot allows movement of the rod without shifting the lever.

As will be at once seen with the gear as shown at Fig. 9 when the top speed drum is in gear all the other drums are at rest, but if the clutch be operated to bring any of the other gears in mesh the top speed drum will then be idle. By multiplying the clutch arrangement the gear could be arranged so that as each gear was in mesh, all the others would be at rest, but the gear shown is a simple and convenient form for practical use.

The speed drums are formed with projections occupying about half the width of the periphery as seen at Fig. 5, and the cavities between these projections are U shape in cross section, the bottom of the U being on a level and forming one smooth surface with the plain surface of the drum. When the drums are assembled they offer, except for their projections, an unbroken cylindrical contour on which the balls may be moved as they pass from one ring of teeth to the next, with perfect smoothness. The edges of the teeth or projections are rounded to facilitate the entry and exit of the locking balls. The plain portions are wide enough to freely accommodate the locking balls when moved out of the projections, the width being slightly more than equal to the diameter of the balls for this purpose, but this plain portion is not absolutely necessary to the working of the gear such as shown in Fig. 9, for example, although adding to the smoothness of its working. The notched ring for effecting the movement of the locking balls should preferably be of a width sufficient to bridge over the smooth, plain surfaces of the drums during the passage of the balls from one ring of teeth to the next, but this is not necessary as the balls could take the bearing during movement.

Although I have described the invention with one ring or series of locking balls only, it will be apparent that two or more may be employed if desired for higher powers; the notches of the ring would in this case be of sufficient length to accommodate the balls and the projections on the drums would be correspondingly long. It is essential for locking that in every case the balls arranged in one transverse plane shall be lodged in separate notches or recesses, but when two or more rings are used the balls in planes parallel to the shaft may be lodged each set in one notch or each ball in a separate notch as found convenient. The projections may be made more or less strong to suit requirements, but I find that with my gear in use the shock is obviated and the gearing may be constructed lighter and more compact than was before possible, at the same time having equal strength.

In some cases where a gear is used some distance from the member on which the variable drive is required, that is, where there is a long chain or belt drive between the gear and the shaft or other member to be driven, the "driven" member of the gear may be considerably simplified, the ring carrying the locking balls being simply toothed on the outer periphery and provided with a shifting mechanism. In this case the ring would form the driven member and its movement out of line would not affect the drive on a long length. If desired the ring of balls may be arranged about the central shaft and be carried by a slidable member to engage speed rings connected with sleeves as before. The teeth or projections of the speed rings would project inwardly and the balls would be moved to engage them as in the case of the drums.

In some cases either the driven member or the driving member may be fluted and the balls engage the flutes so as to be always more positively connected to one member. A convenient way of operating the balls in this case would be to arrange them in a sleeve with holes slightly less than the balls, so that the latter are held in place in the flutes but project partly through said holes; this sleeve may be readily moved along the cylinder or shaft to engage the speed drums or speed rings as the case would be.

The free disk which I have described and shown must not be regarded as an essential element as although it greatly facilitates the easy change from the low to the reverse, the change may be effected without it.

What I claim then is:—

1. A change speed gear having a plurality of notched drums, to be driven at different speeds, a slidable rotary member, a plurality of locking balls retained in said slidable rotary member and movable along into engagement with either of the notched drums to give the speed required.

2. In a change speed and reversing gear, a plurality of grooved rings, a slidable member, a set of locking balls carried thereby, and a driven member, said balls being adapted for movement along the said driven member to engage either of the rings.

3. In a change speed and reversing gear, a series of driven speed drums, a driven member, a shiftable member, and a ring of balls carried in said shiftable member and adapted to engage any one of said drums, for transmitting motion therefrom to said driven member of the gear.

4. A change speed and reversing gear comprising a series of speed drums, a free drum and a reverse driven drum, a sliding ring, a series of locking and driving balls carried by said ring, a boss having a sprocket wheel and provided with guides, said sliding ring sliding along and rotating with said guides, a non-rotating bearing ring and a shifting device supported thereby for effecting the movement of said ring, carrying the balls, along the said guides for bringing the balls into engagement with one or other of the said drums.

5. In a change speed and reversing gear, a plurality of drums with projections thereon extending about half way across the periphery thereof, the remaining portions of the periphery being plain and level with the bottom of the notches between said projections, a plurality of locking balls and means for bringing said balls into engagement with the projections of one or the other of said drums.

6. In change speed and reversing gear a series of drums, a slotted cylinder extending concentrically over said drums, a driven member, connected with said cylinder, and a coupling ring slidable along the slots of said cylinder.

7. In a change speed and reversing gear, a main shaft and a secondary shaft, gears for connecting said shafts, sleeves around the main shaft and provided with gear wheels, gear wheels on the secondary shaft meshing with and driving those on the sleeves, a series of speed drums one directly secured to each sleeve and one directly secured to the main shaft, a coupling ring and means for connecting the same with any of the speed drums, a driving shaft, a driven member, a clutch and operating means therefor connected with said coupling ring, the said clutch connecting one of the gears with one of the shafts, for driving the drums on the sleeves, and disconnecting said main shaft from said secondary shaft when the drum directly on the main shaft is coupled with the driven member, to prevent the driving of the drums on the sleeves.

8. In a change speed and reversing gear, a divided main shaft having a drum part and a driving part, a secondary shaft, sleeves around said main shaft and adapted to be driven by said secondary shaft, a series of speed drums, one of said drums directly keyed on said main shaft and the other drums keyed on said sleeves, a coupling ring, a driven member, a clutch, a loose pinion, and a control lever, operating means connected with said coupling ring and said clutch, and controlled by said control lever, whereby shifting the lever from its position corresponding to coupling of the drum keyed directly on said main shaft to said member unclutches the drum part of said divided shaft from the driving part thereof, and couples the loose pinion to said driving part to connect with the secondary shaft to effect the driving of the drums on the sleeves.

9. In a change speed and reversing gear, a divided main shaft, and a secondary shaft, sleeves around said main shaft and adapted to be driven by said secondary shaft, a series of speed drums, one of said drums directly keyed on said main shaft and the other drums keyed on said sleeves, a coupling ring, a driven member, a clutch, a loose pinion, and a control lever, operating means controlled by said lever connected with the coupling ring and said clutch, and comprising a shifting rod, a pin therein, a plate having a guiding slot therein, said guiding slot and pin effecting the rotation of said rod during its axial movement, projections on said rod and a pivoted clutch fork gripping the said clutch said projections being adapted on rotation of said rod to engage said clutch fork, and on axial movement of said rod to shift said fork to effect coupling and uncoupling of the parts of said divided main shaft to drive one part of said main shaft or the said secondary shaft respectively.

In testimony whereof, I have signed my name to this specification in the presence of two subscribing witnesses.

LUIS WIRTZ.

Witnesses:
J. BEAUMONT PERCIVAL,
STANLEY BANNER.